(12) United States Patent
Orino

(10) Patent No.: US 10,935,053 B2
(45) Date of Patent: Mar. 2, 2021

(54) SPACE-CONSTRAINED HYBRID LINEAR ACTUATOR

(71) Applicant: Ellrich Engineering, LLC, Salt Lake City, UT (US)

(72) Inventor: D. Christopher Orino, Salt Lake City, UT (US)

(*) Notice: Subject to any disclaimer, the term of this patent is extended or adjusted under 35 U.S.C. 154(b) by 135 days.

(21) Appl. No.: 16/172,334

(22) Filed: Oct. 26, 2018

(65) Prior Publication Data

US 2020/0132209 A1 Apr. 30, 2020

(51) Int. Cl.
*F15B 15/08* (2006.01)

(52) U.S. Cl.
CPC ....... *F15B 15/088* (2013.01); *F15B 2211/205* (2013.01); *F15B 2211/212* (2013.01)

(58) Field of Classification Search
CPC .................................................. F15B 15/088
See application file for complete search history.

(56) References Cited

U.S. PATENT DOCUMENTS

| | | | |
|---|---|---|---|
| 3,823,758 A * | 7/1974 | Heese | B63B 19/197 160/188 |
| 4,530,271 A | 7/1985 | Cronin | |
| 6,315,264 B1 | 11/2001 | Baker | |
| 6,637,314 B2 * | 10/2003 | Nagai | F15B 15/088 60/716 |
| 6,971,237 B2 * | 12/2005 | Geiger | F15B 11/0325 60/545 |
| 7,397,209 B2 * | 7/2008 | Hirai | B64C 13/42 318/280 |
| 8,978,356 B2 * | 3/2015 | Burgess | F02K 1/06 60/226.2 |
| 9,618,102 B2 * | 4/2017 | Hirai | F16H 25/205 |
| 10,088,006 B2 * | 10/2018 | Fox | B64C 13/40 |
| 10,190,608 B2 * | 1/2019 | Wildman | B64C 3/56 |
| 2006/0081078 A1 | 4/2006 | Nagai | |
| 2007/0075285 A1 | 4/2007 | Lovejoy | |

\* cited by examiner

*Primary Examiner* — Michael Leslie
(74) *Attorney, Agent, or Firm* — Michael F. Krieger; Kirton McConkie

(57) ABSTRACT

An electric motor-driven, rolling element screw linear actuator is presented which work in cooperation with an hydraulic actuator and share several components. This is achieved through the integration of a screw-driven integrated nut piston assembly. Combining the use of an electric screw driven actuator can also reduce the need for a redundant hydraulic system, resulting in the elimination of 50% of connections, valves, piping, pumps, filters etc., while still being 100% redundant. An additional advantage is that the two drive systems are technologically independent, and therefore will not both fail because of an identical component flaw or failure point. The systems may also be used at the same time if conditions require force in excess of that generated by the hydraulic actuator alone.

20 Claims, 2 Drawing Sheets

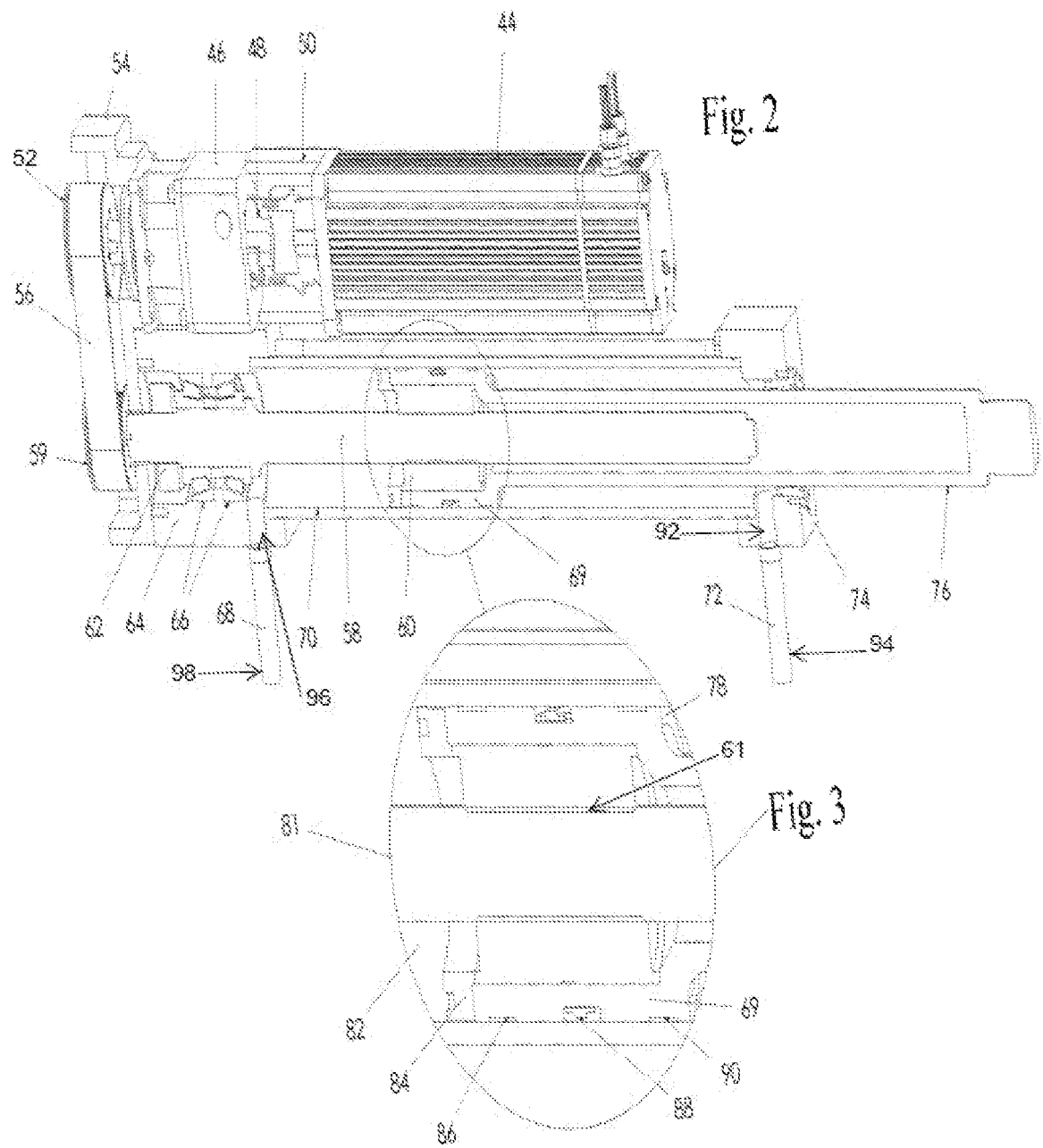

SPACE-CONSTRAINED HYBRID LINEAR ACTUATOR

BACKGROUND OF THE INVENTION

1. Field of the Invention

This invention relates to actuators, and in particular to actuators that must function in a space-restricted environment and in circumstances in which the functioning of the actuator is critical.

2. Background and Related Art

In the oil and gas industry a refinery is made up of a combination of various refining processes used refine crude oil. Some processes are geared towards upgrading heavy oil. One such process is generally known as fluidized cracking or more specifically, Fluidized Catalytic Cracking (FCC), and/or Flexi Coker. Both processes are important refining process, due to the ability to refine crude into a high ratio of high value high octane gasoline. Both processes run 24 hours a day for up to 5 to 7 plus years continuously.

In general, Fluidic Cracking utilizes a catalyst (small sand like particles) which, during the process, allows the formation of coke on the surface of the catalyst. The coked up catalyst is then allowed to flow to another section of the process where the coke particles are either burned off (FCC) or gasified into a higher grade product (Flexicoking).

The process works by "fluidizing" the catalyst, with steam, allowing the catalyst to flow from one section of the process to the next. The control of the flow of these fluidized particles is critical to both the efficiency and safety of the process. The ratio of the catalyst flow must be precisely controlled for the FCC process to maximize efficiency. Another part of the process that is critical to the efficiency of the operation is the management of gas off streams and regenerator flue gasses.

Importantly, in the case of an unintended shut down or loss of control of the process, the flow of catalyst, gas off streams, and flue gas, either, must be controlled throughout the upset condition, or that valves must immediately go to a predetermined position, either open closed, or partially open. Failure of the valves to properly react to the specific upset condition may result in an explosion that could be catastrophic for the refinery, personnel, and surrounding community.

The catalyst, gas off streams and flue gas steam flows are regulated in some cases by valves if various types, such as slide valves, plug valves, butterfly valves etc. The accuracy of control of the catalyst flow requires the valve to be able to be accurately positioned at a high speed.

It is critical to the operation of an FCC unit to ensure the ability to control the gate position at all times. Because of the critical requirement to have the ability to position the valve under any circumstance, systems must be designed with layers of redundancy. This is to ensure that valve positioning is always possible even in the case of a component/components failure, and a backup system/component would be immediate available to take over the primary duty of positioning the valve as required.

To achieve these operational requirements FCC slide valves have traditionally relied on a linear hydraulic actuator. The linear actuator is paired with a hydraulic pump, reservoir and associated valves required to control the fluid flow and pressure to the hydraulic cylinder. The system including the pump, reservoir, valves, filters, and control IO's are typically referred to as an "hydraulic power unit"

Actuators used to activate valves used in a petroleum refinery are often subject to size constraints. Valves are often situated high above the ground on platforms. Actuators used to stroke the valves are often located at the edge of the platform or against machinery. As a result, linear actuated valves may not be made any longer or the actuator may extend over the edge of the platform and make maintenance very difficult. In addition, the location of the Hydraulic Power Unit is restricted and its location sometimes necessitates a change in its design.

BRIEF SUMMARY OF THE INVENTION

Some embodiments of the present invention utilize an electric motor-driven, rolling element screw linear actuator that occupies the same space as an hydraulic actuator. This is achieved through the integration of the screw driven nut, directly with the piston and seals that are found in a hydraulic cylinder. In the present invention the integrated nut piston assembly is directly attached to a single stem, which can then be coupled to the stem on the gate valve, allowing for positioning of the gate. Combining the use of an electric screw driven actuator can also reduce the need for a redundant hydraulic system, resulting in the elimination of 50% of connections, valves, piping, pumps, filters etc., while still being 100% redundant. An additional advantage is that the two drive systems are technologically independent, and therefore will not both fail because of an identical component flaw or failure point. The systems may also be used at the same time if conditions require force in excess of that generated by the hydraulic actuator alone.

Because the screw nut and piston are integrated into a single unit, and cannot be decoupled, the screw will always turn whenever the nut moves, either via the motor turning the screw, or the hydraulic fluid and pressure being applied to one side of the piston nut assembly causing movement of the nut. When hydraulically moving the piston results in back driving of the screw drive, the hydraulic pressure must overcome the loads associated with the back driving of the screw and gear box, with the motor having the ability to be decoupled. Likewise, when using the screw and motor to move the actuator, the thrust output must overcome losses associated with pushing the hydraulic fluid out of the hydraulic volume and through the associated path of hydraulic piping and valving.

One embodiment of the present invention utilizes a simplified hydraulic system, which can be configured in various ways to create layers of redundancy, while having the ability to comply with power outage stroke requirements. The ability to continue to position the actuator without power to the electric motor is achieved by the use of a set of hydraulic accumulators. The accumulators provide a means for power storage and can be introduced to the actuator in the case of a power loss to the motor.

The hydraulic system would be highly simplified when compared to that of a traditional hydraulic power unit. One method of charging, or maintaining the charge in the hydraulic accumulators, could be to use the electric motor driven screw to push the integrated nut piston, creating fluid flow and pressure that would be directed to the accumulators. This can be achieved while simultaneously positioning the fluidic coking valve as required by the process. The motor screw drive output must accommodate the additional load created when charging the accumulators in addition to the load requirements to move the gate on the slide valve.

To create an additional layer of redundancy, the hydraulic circuit includes an hydraulic pump, which could, when required, cycle on and off to recharge the accumulators, with a backup method as described above, using the motor screw drive to move the piston. In such a configured system there are three layers of redundancy. The first layer is the use of the electric motor screw to move the integrated nut/piston assembly. The second layer is the use of the fluid power stored in the accumulators. The third layer would be the use of the pump and the pressure and the flow it generates to move the system.

With respect to the hydraulic system, it would be significantly simplified over that of a traditional hydraulic power unit, and would not require the number of valves, or redundant pumps and reservoirs. Therefore the simplified system could be very compact, self-contained, and positioned relatively close to the actuator and valve. This would be beneficial to reduce losses associated with long hose or pipe runs required to be run from the hydraulic power unit up to the actuator. The reduction in the size of the system is also of value to the end user, as the places where these valves are positioned in the refinery is very limited and can often obstruct egress pathways for personnel and create access problem for maintenance. Embodiments using this integrated design and elimination for the need of a redundant hydraulic system provide an important advantage of this system for fluidic coking service.

Some embodiments of the present invention address the requirement of continuous uninterrupted operation of a fluidized cracking and/or Flexicoking control valve, utilizing an electric motor driven rolling element screw. By integrating the nut with a hydraulic piston, the required upset condition operating requirements can be achieved, reducing cost, and complexity of a traditional hydraulic system. The system also reduces the complexity, and therefore the cost, of the controls required of traditional hydraulic systems. The system possesses multiple layers of technically independent system redundancies which are required for fluidized cracking system and/or Flexicoking. This ensures that, in the case of a fluidic cracking valve, it is able to remain operational under all conditions. Space for equipment on FCC and Flexicokers is in general challenging. The system minimizes space requirements for installation in FCC and Flexi cokers, over traditional systems, creating better accessibility for maintenance. Additional benefits may include improved egress for personnel to get safely off the structure in the case of an emergency.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 2 shows an elevational view of a fully integrated embodiment combining both a traditional screw driven linear actuator with that of an hydraulic actuator; and FIG. 3 shows an enlarged cut-away view of an hybrid electric/hydraulic linear actuator.

DETAILED DESCRIPTION OF THE PREFERRED EMBODIMENTS

Figure 1:
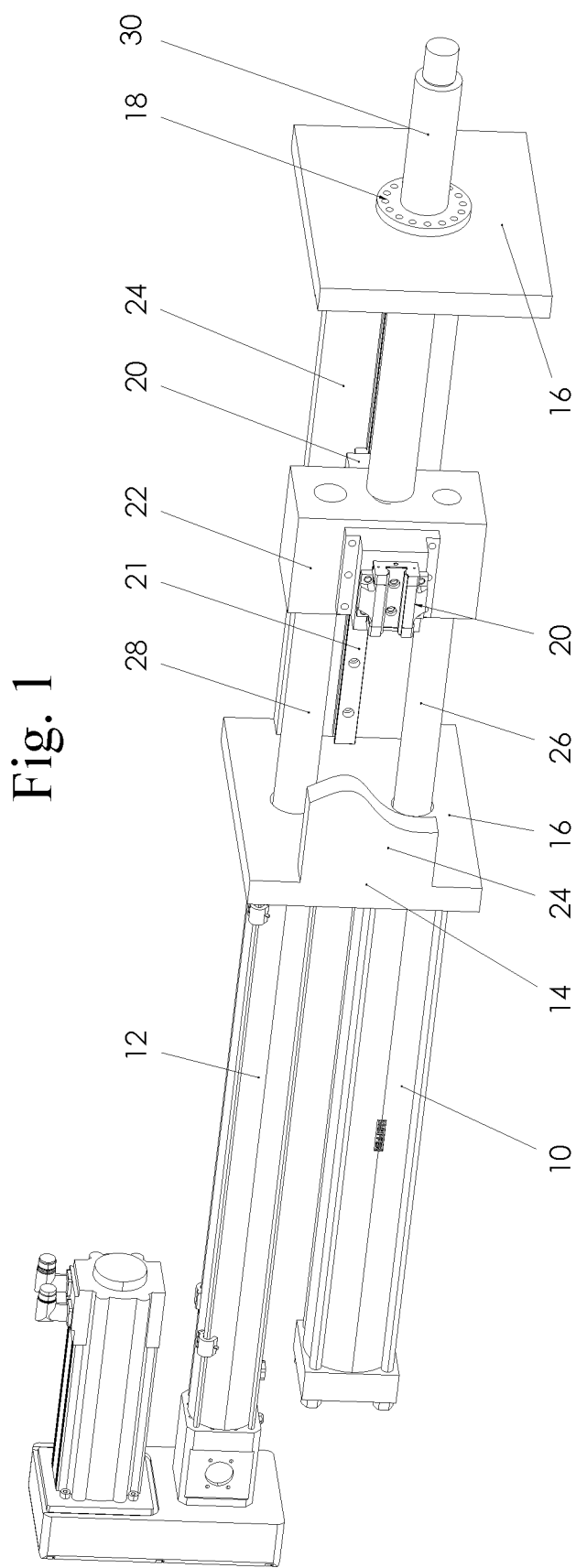
FIG. 1 shows a perspective view of an embodiment combining electric and hydraulic linear actuators to individually or jointly provide a linear force output to a single rod connected to a linear actuated valve.

A linear electric actuator system that combines the features of an electric motor, screw driven, linear actuator with an hydraulic linear actuator is presented. The benefit of combining the two types of linear actuators is to provide a means for an independently redundant system for applications that require redundancy to prevent shutdowns and process interruptions.

In addition to the benefit of a truly independent redundant system several new and novel control options can be realized. By combining the unique and independent operational characteristics only available with an electric motor screw driven actuator with the unique and independent operational characteristics only found with the hydraulic linear actuator, new novel control features can be executed.

There are two embodiments for combining the electric and hydraulic actuators into a system that works jointly to create a redundant integrated system. The embodiment in FIG. 1 depicts the combination of individual elements, including an hydraulic cylinder, with a linear electric actuator, connecting the two via a common mounting plate, as well as a coupling assembly to tie each of the ends of the actuating rods together.

The integrated embodiment shown in FIG. 2, integrates electric and hydraulic technologies together by designing an hydraulic piston, including guides/bearings and seals to be physically integrated into and/or capture the nut of the electric actuator screw driven actuator. In this approach the hydraulic fluid and the driving screw would occupy the same space. This embodiment minimizes failure points in the system, as well as minimizes the physical size of the system.

Referring now to the embodiment in FIG. 1, an embodiment is depicted having an hydraulic linear actuator 10 and an electric linear actuator 12, both mounted to a bearing mounting guide frame assembly 14. Components such as mounting a plate 16, a rod tie block linear guide bearing 20, linear guide bearing rail 21, a rod tie block 22, and a rod guide bearing 18, are all mounted to frame assembly 14. Frame assembly 14 is made up of end mounting plates attached by rails 24. Mounted to the rails are linear guide bearings 20 and liner guide bearing rail 21. Rod guide bearing 18 is mounted into end plate 16, also part of frame assembly 14. Rod end tie block 22 ties both hydraulic actuator rod 26 and electric actuator rod 28 together. Rod tie block 22 is guided by linear rails 21 and linear guide bearings 20. Hydraulic actuator rod 26 and electric actuator rod 28 are connected to rod tie block 22 which is also connected to a single centrally mounted rod 30 that provides a single linear output.

Actuation of either or both of hydraulic actuator rod 26 or electric actuator rod 28 move rod tie block 22 which then moves single central rod 30 through rod guide bearing 18. Rod guide bearing 18 provides low friction guidance to the single central rod 30 and reacts to forces imparted that are not in the direction of travel of the single central rod 30. Single central rod 30 is attached to a liner actuated valve.

By connecting extension/retract rods 26, 28 together, OR by designing the electric and hydraulic actuators into a single unit physically occupying the same space as in other embodiments, a redundant system is realized. The unit may be operated under various conditions to utilize the unique control capabilities of both systems simultaneously.

In a second embodiment, this one shown in FIG. 2 utilizes a linear electric actuator system that combines the features of an electric motor, screw driven, linear actuator with a hydraulic linear actuator. The benefit of combining the two types of linear actuators is to provide a means for independently redundant system for applications that require redundancy to prevent shutdowns and process interruptions.

In addition to the benefit of a truly independent redundant system several new and novel control options can be realized. By combining the unique and independent operational characteristics, only available with an electric motor screw driven actuator, with the unique and independent operational characteristics, only found with the hydraulic linear actuator, new novel control features can be executed. In this embodiment, the two technologies are integrated together by designing a hydraulic piston, including guides/bearings and seals to be physically integrated into and/or capture the nut of the electric actuator screw driven actuator. In this embodiment, the hydraulic fluid and the driving screw occupy the same space. This embodiment minimizes failure points, but also minimizes the space and in particular, the length of the system. The unit may also be operated under various conditions to utilize the unique control capabilities of both systems simultaneously.

When hydraulic fluid power is used to create a thrust force to move the nut piston assembly during either extension or retraction of the rod, the thrust force generated by the hydraulic pressure against the piston is allowed to passively back drive the screw and power train. There is no torque applied via operation of the electric motor. The use of a high efficiency screw limits the forces required to back drive the screw to a minimum.

When power is supplied to the electric motor to create a thrust force in the extension/retract rod, the hydraulic system is allowed to pass hydraulic fluid from one side of the piston to the other with minimal losses. The thrust loss due to pushing hydraulic fluid through the control valve is determined by the sizing of the control valves and hydraulic lines. Alternatively, hydraulic pressure in conjunction with the application of torque from the electric motor, is applied to either side of the piston, to match the speed and direction of the drive screw nut, to account for fluid losses (which would equate to a loss in thrust generation). This would be useful in situations where a maximum speed is required for the movement of the extend/retract rod.

Referring now to FIG. 2, a fully integrated unit is shown which combines a screw-driven linear electric actuator with a hydraulic actuator. An electric motor 44 drives a gear reducer 46 through a shaft alignment coupling 48. A standoff 50 creates space between motor 44 and gear reducer 46 and the shafts that connect them. 1st stage gear reducer 46 drives a drive belt/chain/gear 52 inside of gear housing 54. It will be understood that a belt, chain or gears by be used for this purpose. Belt 56 drives a system attached to an output shaft of the 2nd stage gear set 59, made up of the drive gears/pullies in the belt/chain assembly, and the drive end of the screw 58. It will be appreciated that gears of varying sizes may be used to alter the speed and or thrust per the requirements of the applications. The gear set 46, 52, 59 in combination with the motor specification define the speed and thrust of the screw/nut 60. A drive screw retention nut 62 captures drive screw 58 and is pre-tensioned to provide the correct alignment/thrust bearing pre-load as well as to prevent fatigue of the screw end from changes in direction of the applied force. A thrust bearing housing 64 and drive screw thrust and alignment bearing set 66 keep drive screw 58 aligned. A piston 69 is moved by hydraulic pressure to push or pull an actuator rod 76. Hydraulic fluid is provided through hydraulic fluid supply line 68. Surrounding drive screw 58 is a piston/nut guide housing 70. This forms one part of the pressure boundary for the hydraulic system and provides alignment of the piston/nut assembly so it is concentric with bearing housing 64 and drive screw 58. A hydraulic fluid return line 72 allows hydraulic fluid to enter or exit the forward (rod side) of the hydraulic chamber which forms the rod side hydraulic volume. A rod guide seal assembly 74 provides guidance and acts as a bearing for the sliding rod. This assembly also provides sealing of the rod and the forward hydraulic volume. Actuator rod 76 is directly connected and sealed to a piston/nut carrier 78 and therefore to piston 69). A hollow portion of rod 76 is exposed to hydraulic pressure from the screw side only of piston 69. The hydraulic piston seal on the piston/nut carrier seals one side of the assembly in the housing from the other side. To create an additional layer of redundancy, the hydraulic circuit includes an hydraulic pump 94, 96, which could, when required, cycle on and off to recharge the accumulators 92, 96, with a backup method as described above, using the motor screw drive to move the piston. In such a configured system, there are three layers of redundancy.

This is done using a hollow push rod that is sealed on the clevis end. The push tube is attached and sealed to the nut carrier/piston. The assembly 81 seals hydraulic fluid pressure from one side of piston 69 to the other side.

Referring now to FIG. 3, a drive screw retention ring 80 is shown capturing and retaining drive screw nut 69 in the piston/rod assembly 81 A piston/nut wear guide 86 guides the piston/nut assembly 81. A hydraulic piston seal 88 separates the forward or outer diameter rod side hydraulic volume from the rear or inner diameter of the rod hydraulic volume. A piston/nut wear guide 90 guides the piston/nut assembly 81.

The electric motor screw drive system takes rotary and torque output from motor 44, through the gear/power 52, and 46 transfer system and into the drive screw 58. The nut/piston assembly 81 is prevented from rotating. Because the main drive screw 58 is rotating, and the nut 60 is not allowed to rotate, nut 60 changes linear position coincident with the centerline of the screw 58 shaft. The nut carrier/piston assembly 81 is connected to the rod 76 and can linearly translate rod 76 when moved by the applied load. The thrust output is a function of motor output torque, subtracting the inertial and frictional losses (and in the case of this invention the fluid losses) in the system.

Traditional hydraulic systems designed with redundancy utilize a hydraulic power unit with redundant pump and valve control systems to minimize the impact of failures of individual components. The space requirements, complexity and cost of such a system is significant. In the present invention, the redundancy created by multiplying these components can be re-created in a space efficient system, utilizing an efficient electric operated screw driven linear actuator. Additionally the redundancy of the system utilizes two different technologies, which prevents weaknesses inherent in one system from being multiplied, thus creating a truly independently redundant system.

The hybrid electric-hydraulic actuator system utilizes typical hydraulic system valves for controlling a traditional hydraulic cylinder with additional valves for allowing the cylinder to passively move hydraulic fluid from one side of the piston to the other in the cylinder/s or combined electric hydraulic cylinder. This allows for the piston to be moved with the torque input from an electric motor drive system to the screw/drive independent of the hydraulic system.

When hydraulic fluid power is used to create a thrust force to move the nut piston assembly 81 during either extension or retraction of rod 76, the thrust force generated by the hydraulic pressure against piston 69 is allowed to passively back drive the screw 58 and power train. There is no torque applied via operation of the electric motor. The use of a high efficiency screw 58 limits the forces required to back drive screw 58 to a minimum.

When power is supplied to the electric motor 44 to create a thrust force in extension/retract rod 76, the hydraulic system is allowed to pass hydraulic fluid from one side of the piston to the other with minimal losses. The thrust loss due to pushing hydraulic fluid through the control valve would be determined by the sizing of the control valves and hydraulic lines.

Alternatively, hydraulic pressure in conjunction with the application of torque from electric motor 44 could be applied to either side of piston 69, to match the speed and direction of the drive screw nut 60, to account for fluid losses (which would equate to a loss in thrust generation). This would be useful in situations where a maximum speed is required for the movement of extend/retract rod 76.

This embodiment combines the functionality of both an electric screw driven linear actuator with that of a traditional hydraulic linear actuator system. Because the system is designed to work as an independent electric actuator or an independent hydraulic actuator system that are linked together, the control of the combined system under basic operation are not affected by a failure of the other system. The function of the combined system is to be managed by a high-level control system such as a micro controller or PLC, to manage the logic required to operate. Inputs are numerous and include redundant position encoders, pressure sensors, servo and control valves, VFD, and soft starters. The positions possible include: electric operation with hydraulic system bypass—retract; electric operation with hydraulic system bypass—extend; hydraulic system operation with passively back driven screw—extend; and hydraulic system operation with passively back driven screw—retract. Clearly, all positions between these positions are also achievable. Also available are: electric operation with hydraulic deceleration and positioning assist; electric operation with hydraulic hard stop final positioning; hydraulic operation with electric final positioning; and electric operation with pumpless changing of the accumulators. Accumulators are used to store pressurized hydraulic fluid to be used to hydraulically actuate rod 76 even when the hydraulic power system has failed. The accumulators may also provide hydraulic assist to the electric actuation of rod 76.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An hybrid linear actuator comprising:
   a first drive assembly comprising:
      an electric drive motor having an output shaft;
      a drive screw attached to the output shaft;
      a drive nut threaded to the drive screw; and
      an output rod having two ends, a first end attached to the drive nut so that rotation of the drive screw advances or retracts the output rod, and the second end capable of attachment to a linear actuated valve;
   a second drive assembly comprising:
      an hydraulic cylinder,
      a piston disposed in the hydraulic cylinder and linked to the output rod, and
      a hydraulic pump fluidly connected to the hydraulic cylinder and operable to selectively pressurize the hydraulic cylinder on either side of the piston to thereby vary a position of the piston within the hydraulic cylinder to thereby extend and retract the output rod;
   wherein the drive screw is disposed at least partially within the hydraulic cylinder and is of unitary construction; and
   wherein the actuator has a third drive assembly comprising first and second hydraulic accumulators fluidly connected to the hydraulic cylinder and operable to selectively pressurize the hydraulic cylinder on at least one side of the piston and wherein the first and second hydraulic accumulators are configured to be charged by the electric motor.

2. The linear actuator of claim 1, wherein the piston within the hydraulic cylinder is operable to rotate the drive screw.

3. The linear actuator of claim 1, further comprising a shaft alignment coupling mechanism interposed between the drive screw and the output shaft of the electric drive motor, said shaft alignment coupling mechanism operable to selectively couple and decouple the drive screw and the output shaft.

4. The linear actuator of claim 1, wherein the drive screw and the output rod are coaxial.

5. The linear actuator of claim 1, wherein the output rod comprises a hollow interior, and wherein the drive screw extends into the hollow interior of the output rod.

6. The linear actuator of claim 1, wherein the drive nut is disposed in the hollow interior of the output rod.

7. A compact hybrid linear actuator comprising:
   an hydraulic cylinder having an inner chamber, a proximal end and a distal end;
   an output rod extending from the distal end the hydraulic cylinder, the output rod having a proximal end and a distal end;
   a piston on the proximal end of the output rod, the piston being disposed within the inner chamber of the hydraulic cylinder;
   the piston dividing the inner chamber of the hydraulic cylinder into a first pressure chamber and a second pressure chamber;
   a nut disposed in the first pressure chamber of the hydraulic cylinder;
   the nut disposed in a fixed, non-rotatable relationship with respect to the output rod;

a drive screw disposed in the first pressure chamber and installed into the nut such that rotation of the drive screw moves the output rod; and wherein the actuator comprises a third drive assembly comprising a first accumulator fluidly connected to the hydraulic cylinder and operable to selectively pressurize the hydraulic cylinder on a first side of the piston and a second accumulator fluidly connected to the hydraulic cylinder and operable to selectively pressurize the hydraulic cylinder on a second side of the piston and wherein the electric motor driven screw pushes the integrated nut piston, to create fluid flow and pressure into at least one of the first accumulator and the second accumulator configured to charge at least one of said first or second accumulator.

8. The linear actuator of claim 7, wherein the output rod further comprises a hollow interior, wherein a distal end of the drive screw extends into the hollow interior of the output rod.

9. The linear actuator of claim 7, wherein a proximal end of the drive screw extends from the proximal end of the hydraulic cylinder.

10. The linear actuator of claim 7, further comprising an electric motor having an output shaft linked to the proximal end of the drive screw by a drive system.

11. The linear actuator of claim 7, wherein the drive system comprises one of a belt, chain, and gear.

12. The linear actuator of claim 7, wherein the drive system comprises shaft alignment coupling mechanism operable to selectively couple and decouple the output shaft and the drive screw.

13. The linear actuator of claim 7, further comprising:
a first valve fluidly connected to the first chamber, the first valve being operable between an open position and a closed position;
a second valve fluidly connected to the second chamber, the second valve being operable between an open position and a closed position.

14. The linear actuator of claim 13, further comprising a hydraulic pump fluidly connected to the first valve and the second valve.

15. A linear actuator having redundant power sources for use in space constrained areas comprising:
an output rod having a proximal end and a distal end;
the output rod having a hollow passage way extending from its proximal end toward its distal end;
a first drive assembly comprising:
 a drive nut disposed in a non-rotatable and fixed position with respect to the output rod,
 a drive screw installed into the drive nut such that the drive screw extends into the hollow passage way of the output rod, and
 an electric drive motor having an output shaft linked to the drive screw such that rotation of the output shaft rotates the drive screw to thereby extend and retract the output rod;
a second drive assembly comprising:
 a hydraulic cylinder,
 a piston disposed in the hydraulic cylinder and linked to the output rod, and
 an hydraulic pump fluidly connected to the hydraulic cylinder and operable to selectively pressurize the hydraulic cylinder on either side of the piston to thereby vary a position of the piston within the hydraulic cylinder to thereby extend and retract the output rod; and
a third drive assembly comprising:
 a first accumulator fluidly connected to the hydraulic cylinder and operable to selectively pressurize the hydraulic cylinder on a first side of the piston; and
 a second accumulator fluidly connected to the hydraulic cylinder and operable to selectively pressurize the hydraulic cylinder on a second side of the piston; and
 wherein at least one of the first accumulator and second accumulator is configured to be charged by the electric motor.

16. The third drive assembly configured to charge the accumulator of claim 15 wherein the actuator comprises the actuator on a coking drum valve wherein the first or second accumulator is charged while the fluidic coking valve is positioned.

17. A compact hybrid linear actuator comprising:
an output rod;
a first drive assembly comprising:
 a drive nut linked to the output rod,
 a drive screw installed into the drive nut,
 an electric drive motor having an output shaft linked to the drive screw such that rotation of the output shaft rotates the drive screw to thereby extend and retract the output rod, and
a second drive assembly comprising:
 an hydraulic cylinder,
 a piston disposed in the hydraulic cylinder and linked to the output rod, and
 an hydraulic pump fluidly connected to the hydraulic cylinder and operable to selectively pressurize the hydraulic cylinder on either side of the piston to thereby vary a position of the piston within the hydraulic cylinder to thereby extend and retract the output rod,
 wherein the first drive assembly and the second drive assembly are individually capable of extending and retracting the output rod if the other drive assembly fails; and
 wherein the output rod comprises a hollow interior, and wherein the drive screw extends into the hollow interior of the output rod; and
a third drive assembly comprising:
 a first accumulator fluidly connected to the hydraulic cylinder and operable to selectively pressurize the hydraulic cylinder on a first side of the piston; and
 a second accumulator fluidly connected to the hydraulic cylinder and operable to selectively pressurize the hydraulic cylinder on a second side of the piston.

18. A compact hybrid linear actuator as recited in claim 17, further comprising a housing wherein the hydraulic fluid and the driving screw are in the same housing.

19. A compact linear actuator as recited in claim 17, wherein the first drive assembly and the second drive assembly may be operated at the same time to increase the thrust on the output rod.

20. A compact linear actuator as recited in claim 17, wherein when the second drive assembly is used to create a thrust force to move the piston during either extension or retraction of the rod, the thrust force generated by the hydraulic pressure against the piston is allowed to passively back drive the screw in the first drive assembly.

\* \* \* \* \*